FIG. 1

United States Patent Office 3,476,513
Patented Nov. 4, 1969

3,476,513
PROCESS AND APPARATUS FOR THE CONVERSION OF SO₂ IN FLUE GAS TO SULFUR
Albert B. Welty, Jr., Westfield, and Russell R. Johnson, Mountainside, N.J., and Glenn A. Atwood, Akron, Ohio, assignors to Esso Research and Engineering Company, a corporation of Delaware
Filed Aug. 25, 1966, Ser. No. 575,091
Int. Cl. C01b *17/04;* B01j *9/04*
U.S. Cl. 23—225        6 Claims

ABSTRACT OF THE DISCLOSURE

The present disclosure relates to an improved process for the conversion of $SO_2$ in flue gas to elemental sulfur wherein the $SO_2$ containing flue gas is split into a major and minor stream and then a hydrocarbon is combusted under controlled conditions to yield a reducing gas containing CO and $H_2$. The major portion of $SO_2$ in the flue gas is reacted catalytically with the reducing gas to yield $H_2S$. Finally, the minor portion of $SO_2$ containing flue gas is reacted with the $H_2S$ stream to yield elemental sulfur.

---

Figure 2:
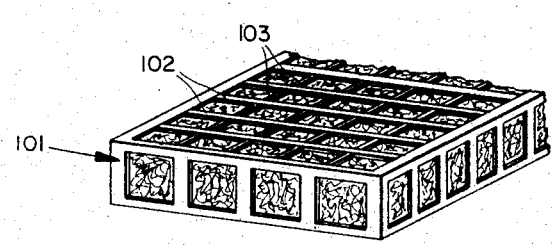

This invention relates to a process for the conversion of $SO_2$ in flue gas to sulfur. More particularly the invention relates to the production of $H_2S$ for use in the Claus reaction in which $SO_2$ is reacted with $H_2S$ to produce sulfur.

Some high sulfur coals and fuel oils which are burned in the boiler-generator units of electric power stations and other industrial furnaces are the source of air pollution problems in heavily populated areas. The flue gas from these fuels contains $SO_2$ and efforts are being made to develop efficient processes for removing this material.

A process currently being considered involves the reaction of two parts of $H_2S$ with one part of $SO_2$, i.e., the Claus reaction. It is known that this reaction will proceed at temperatures above 200° F. in the presence of an alumina catalyst and the resultant sulfur is quantitatively adsorbed on the alumina. The alumina is regenerated by heating to above 850° F. thereby vaporizing the sulfur.

The prior art processes provide the necessary $H_2S$ by reacting a part of the Claus sulfur with hydrogen—see Netherlands patent application No. 6,503,479, published Sept. 20, 1965, or by reacting $SO_2$ with hydrogen—see Doumani, et al., Ind. and Eng. Chem., vol. 36, No. 4, April 1944, pp. 329–332. A large part of the cost of the prior art processes is associated with making $H_2S$. If a method could be found for causing $H_2S$ and $SO_2$ to appear in the desired 2 to 1 stoichiometric ratio prior to the Claus reaction step, important savings should result.

We have found that the required $H_2S$ can be supplied by a carefully managed combustion step applied to a part of the flue gas. We have further found that certain configurations of apparatus elements and processing steps provide a more feasible approach to the problem of converting $SO_2$ in flue gas to sulfur.

Broadly speaking, the invention comprises dividing the flue gas into a major portion comprising about two-thirds of the gas and a minor portion comprising about one-third of the gas. This division of the gas is made at a point where the flue gas is leaving the combustion zone and has a temperature of 2000 to 3000° F. A hydrocarbon vapor which will burn without making smoke at the low oxygen concentration prevailing in this part of the furnace is added to the isolated major portion. Sufficient hydrocarbon is added to consume the excess air (oxygen) used in the primary combustion and to place the gas slightly on the reducing side such that subsequent equilibration over catalyst at a lower temperature will convert essentially all of the $SO_2$ to $H_2S$. This gas is cooled to the range of 1000–1600° F. in the superheater section of the furnace, passed over a catalyst which reacts $H_2$ and CO with $SO_2$ to form $H_2S+H_2O+CO_2$, and further cooled to about 600–900° F. The $H_2S$-containing stream is then mixed with the minor portion of the gas and the $SO_2$ and $H_2S$ are cooled and reacted to produce sulfur. The conversion to sulfur and the removal of the sulfur from the catalyst are carried out in a raining solids type reactor and a transfer line regenerator in one embodiment and in a transfer line reactor and a raining solids type regenerator in another embodiment.

Figure 1:
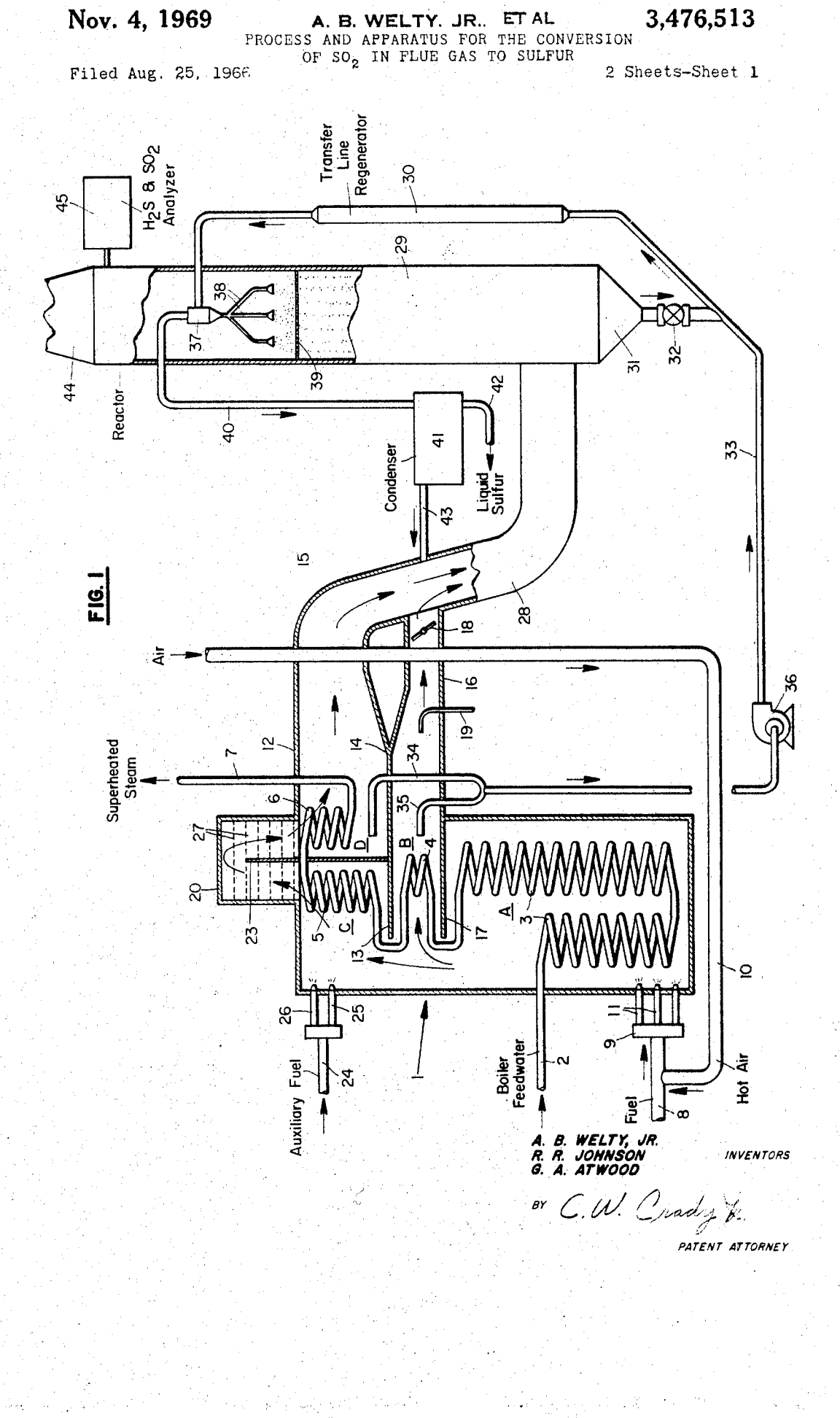
Figure 3:
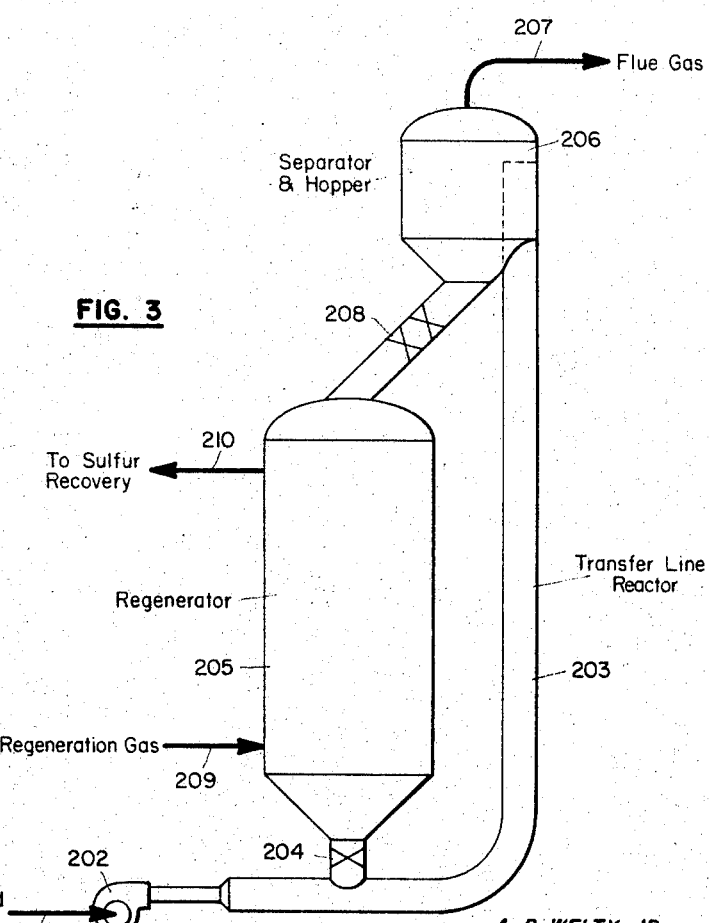

The invention will be more fully described below in conjunction with the drawings in which FIGURE 1 is a diagrammatic flow sheet of the overall process. FIGURE 2 is a partial view of one type of catalyst arrangement and FIGURE 3 is a diagrammatic flow sheet of the embodiment in which the Claus reaction is carried out in a transfer line reactor.

Reference numeral 1 refers generally to a steam boiler. The boiler may be of any conventional type designed to produce about 100,000 to 3,000,000 lbs. of steam per hour. Boilers of this capacity are disclosed in Stanair, Plant Engineering Handbook, 2nd. Ed., 1959, pp. 12–60 to 12–91. The structural features of the boiler, including the placement of the tubes within the various sections, the number and type of burners, etc., do not constitute any part of the invention. In the embodiment shown, the boiler has a main combustion section A and three superheater sections B, C and D. Feed water from line 2 passes through the tubes 3 of section A, the tubes 4 of section B, the tubes 5 of section C, the tubes 6 of section D and steam is removed from the boiler by line 7. Fuel such as oil, coal or a mixture of these is passed by line 8 into manifold 9. Preheated combustion air is supplied by line 10. The fuel air mixture is supplied to the furnace by a plurality of burners shown generally by reference numeral 11. Hot combustion gases pass upwardly through the furnace.

A large duct shown generally by reference numeral 12 extends horizontally from the upper or superheat section of the furnace. This duct takes the place of the flue and it can be located at any suitable point on the upper portion of the furnace. This duct has a cross sectional area sufficient to handle all the flue gas passing out of the furnace. The duct is divided into two independent sections by a plate 13. The plate extends to a point 14 outside the furnace where the two sections are spacially separated into pipes 15 and 16.

In the furnace, the lower section of the duct is defined by plate 13 and plate 17. The latter plate extends into the furnace and serves to divide the heating section from the superheat section of the boiler. This lower section of the duct and pipe 16 are designed to carry approximately one-third of the flue gas from the furnace to the reactor. Pipe 16 contains a damper 18 which is adjusted to regulate the volume of gas passing through the lower section of the duct and pipe 16. A pitot-type flow device 19 continuously measures the volume of flue gas passing through pipe 16. If desired, the damper can be automatically controlled by suitable controls, not shown.

Approximately two-thirds of the flue gas passes into the upper section of duct 12. A catalytic reactor 20 is mounted above the upper section of duct 12 and the reactor is partially open along the bottom so that it is in gas flow communication with superheat sections C and D. A vertical dividing plate 23 defines superheat sections C and D and extends well into the reactor causing the flue gas to follow the path shown by the arrows. Auxiliary hydrocarbon fuel is added by line 24 to the two-thirds portion of the flue gas as it enters into the upper section of duct 12. The auxiliary fuel can be a hydrocarbon gas or vapor, or, as is shown in the drawing, a liquid hydrocarbon fuel which is atomized by nozzles 25 and 26. This fuel burns in an oxidative reforming reaction consuming the excess air in the flue gas and hydrogen and CO are produced, i.e., $O_2$+slight excess of hydrocarbon→$H_2$+$H_2O$+$CO_2$+CO Any hydrocarbon fuel is suitable, but when heavy oils are used, they must be well atomized by the nozzle in order to effect clean combustion. Suitable fuels include methane, propane, natural gas, refinery gas streams, as well as liquid hydrocarbons having an initial boiling point of 40–600° F., preferably 40–150° F. The amount of auxiliary fuel added to the flue gas is closely controlled so that only a slight excess over that required to consume all the oxygen in the flue gas is added. Means are known to calculate and/or analyze the oxygen content of flue gas. Furthermore, techniques are well developed for carrying out low excess air combustion in boilers and other industrial furnaces so that the air content of the flue gas can be reduced to a minimum. Generally, the quantity of auxiliary fuel will be about 1 to 10% of the fuel to the main combustion section of the boiler furnace.

The two-thirds portion of the flue gas, now containing $H_2$ and augmented in CO, passes into reactor 20. The reactor contains a catalyst which will promote the reaction of $SO_2$ and $H_2$ and CO, e.g., $$SO_2+3H_2 \rightarrow 2H_2O+H_2S$$

and $$SO_2+2CO+H_2 \rightarrow 2CO_2+H_2S$$

These reactions take place at a temperature in the range of 1000 to 1400° F. and at the prevailing pressure, which is usually slightly above atmospheric. Suitable catalysts include oxides and sulfides of Group VIII of the Periodic Table such as oxides and sulfides of iron, oxides and sulfides of nickel, oxides and sulfides of cobalt, and oxides and sulfides of platinum, or oxides and sulfides of Groups VI–A and VII–A, such as oxides and sulfides of chromium, oxides and sulfides of molybdenum, oxides and sulfides of tungsten, and oxides and sulfides of manganese or combinations of these. The catalysts are preferably supported on or associated with a support material such as silica, alumina, zirconia, zirconia-silica, magnesia-alumina-silica, silica-alumina, bauxite, etc.

In one embodiment, the catalyst is prepared in the form of thread-like strands and the strands or fibers are confined in a suitable frame to form a batt. Reference numeral 27 refers generally to a series of dashed lines which connote a series of catalyst batts placed in horizontal layers in the reactor 20.

FIGURE 2 shows a partial view of one suitable rectangular frame shown generally by reference numeral 101. The frame includes a series of braces 102 and struts 103 which serve to confine the catalyst strands while large openings are left for the gas to pass through in intimate contact with the catalyst fibers. Equivalent means can be used to expose the gas to the catalyst without encountering a large pressure drop. For example, the catalyst can be placed on a series of trays mounted one above the other in the reactor, or the catalyst can be formed into a honeycomb structure. In general, the catalyst occupies from 10–70% of the volume of the reactor and is placed so that a maximum pressure drop of 0.1 to 1.0 p.s.i. is encountered by the flue gas as it passes through the reactor. Flue gas containing $H_2S$ enters pipe 15 at a temperature of 600–900° F. Untreated flue gas enters pipe 16 at a temperature of 600–900° F. The two streams of flue gas are heat exchanged with cold combustion air passing through line 10. The two flue gas streams are merged in line 28 at a temperature in the range of 200 to 400° F., preferably about 300° F.

Flue gas containing $SO_2$ and $H_2S$ is passed by line 28 to reactor 29 for the Claus reaction. In a preferred embodiment, reactor 29 is a raining solids type reactor and line 30 is a transfer line regenerator. The flue gas passes up through the reactor countercurrent to a shower of conventional alumina Claus catalyst and the desired reaction takes place, e.g.

$$2H_2S+SO_2 \rightarrow 3S+2H_2O$$

Sulfur is absorbed on the catalyst particles and they fall to the bottom area 31 of the reactor. Catalyst containing absorbed sulfur is continuously withdrawn from the reactor through slide valve 32. Any equivalent sealing means can be employed at the bottom of the reactor. Hot regeneration gas at a temperature of 900–1100° F. in line 33 continuously carries catalyst into transfer line regenerator 30. The hot regeneration gas is preferably obtained from the superheat zones of the boiler. Lines 34 and 35 show gas taps within the superheat zones. Blower 36 is employed to impart suitable velocity to the regeneration gas.

Transfer line regenerator 30 is a vertical elongated regeneration zone having a length to diameter ratio in the range of 4 to 1 to 20 to 1. The gas velocity in the zone is 10 to 25 ft. per second and this velocity is adjusted in accordance with the specific gravity of the sulfur containing catalyst, the particle size of the catalyst and the catalyst to gas ratio in the zone, in such a way as to minimize carry-over of catalyst with the flue gas.

Sulfur is vaporized from the catalyst in transfer line regenerator 30 and the two are separated in separation vessel 37. The temperature in the separator is 800–1000° F. Regenerated catalyst is returned to the reactor through a plurality of distributor pipes 38 and a distribution plate 39. Vaporized sulfur passes by line 40 to sulfur condenser 41. The temperature in the condenser is maintained at about 245–315° F., preferably about 275° F. Molten sulfur is removed by line 42. Spent regeneration gas is passed by line 43 to pipe 28 where it joins the flue gas, whereby any sulfur vapor in the gas leaving sulfur condenser 41 is absorbed by the alumina Claus catalyst in vessel 29 before the gas is vented.

Purified flue gas is vented from the system through stack 44. In a preferred embodiment, a continuous $H_2S$ and $SO_2$ analyzer 45 is employed at the top of the reactor to monitor the quantity of these gases leaving the system. Information obtained from the analyzer can be used as a basis for making adjustments in the various steps and streams in the system.

FIGURE 3 discloses an embodiment in which the functions of the Claus reaction units of FIGURE 1 are switched. $H_2S$ enriched flue gas in line 201 (which corresponds to line 28 of FIGURE 1) passes through blower 202 and then into transfer line reactor 203 at a temperature of 200 to 400° F. Regenerated alumina catalyst passes through an air lock 204 at the bottom of regenerator 205. Driven by the blower, the gas and catalyst pass upward through the transfer line reactor and $H_2S$ and $SO_2$ in the flue gas react to form sulfur and water. The reactor dimensions and flow rates are similar to those mentioned previously in the description of FIGURE 1. Purified flue gas and sulfur-containing catalyst are separated in separator 206. The separator also functions as a catalyst hopper to balance the catalyst inventory in the system. Purified flue gas is passed by line 207 to the stack or to air preheaters, not shown.

Sulfur-containing catalyst is passed through air lock 208 into regenerator 205. Hot regeneration gas at a temperature of 800–1100° F. is passed into the lower section of the regenerator by line 209. The gas passes upwardly through the regenerator vaporizing sulfur from the surface of the catalyst as the bed of catalyst moves downwardly. Regeneration gas and sulfur vapor are removed by line 210 and passed to a sulfur recovery unit, not shown.

The following example demonstrates the process. 135,000 pounds per hour of petroleum residuum fuel, containing 4.0 wt. percent sulfur, are fed to the combustion zone of a 250 mw. power plant. Combustion of the fuel produces 25,700,000 std. cu. ft. per hour of flue gas containing 0.25 vol. percent $SO_2$. 1,300 pounds per hour of auxiliary fuel is injected into two-thirds of the flue gas, i.e., 17,100,000 std. cu. ft. per hour of the flue gas, after the major combustion is complete and the resulting flue gas is contacted with 140,000 pounds of nickel oxide on zircon mullite honeycomb catalyst at a temperature of 1300° F. and a pressure of 0.5 p.s.i.g., whereby 44,400 std. cu. ft./hr. of $H_2S$ is produced. 8,600,000 std. cu. ft./hr. of untreated flue gas is mixed with the $H_2S$ containing flue gas and the mixture is contacted with 54,000 pounds per hour of alumina catalyst containing 99 wt. percent $Al_2O_3$, 1 wt. percent $SiO_2$. 5,350 pounds per hour of sulfur are recovered from the process and substantially $SO_2$ free flue gas is vented into the atmosphere.

The process and apparatus of the invention provides an integrated system for the purification of flue gas which requires no external means for providing $H_2S$ for the Claus reaction step. Furthermore, the Claus reaction step is carried out with continuous reaction and regeneration of the catalyst.

We claim:
1. A process for the conversion of $SO_2$ in flue gas to elemental sulfur comprising the following steps in combination:
   (A) dividing a stream of flue gas containing $SO_2$ and oxygen into a major portion and a minor portion;
   (B) adding a quantity of a hydrocarbon to said major portion sufficient to place said stream in a slightly reducing condition upon combustion;
   (C) combusting said added hydrocarbon with said oxygen at a temperature in the range from about 2000° to 3000° F. whereby said oxygen is consumed and hydrogen and carbon monoxide are produced;
   (D) passing said major portion of flue gas containing $SO_2$, hydrogen and carbon monoxide into contact with a catalyst comprising a metal oxide or sulfide selected from the class consisting of the oxides and sulfides of iron, nickel, cobalt, platinum, chromium, molybdenum, tungsten, manganese and mixtures thereof at a temperature in the range between about 1000° to 1600° F. whereby said $SO_2$ in said major portion is converted to $H_2S$;
   (E) reacting the $H_2S$ produced in step (D) with the $SO_2$ contained in said minor portion of said flue gas at a temperature in the range between about 200° to 400° F. in the presence of a Claus catalyst whereby elemental sulfur is produced; and
   (F) recovering said elemental sulfur as product.

2. The improved process of claim 1 wherein said major portion of flue gas consists of 60–75% of the original amount and said minor portion of flue gas consists of 25–40% of the original amount.

3. The process of claim 1 wherein said elemental sulfur is absorbed on said Claus catalyst and is recovered therefrom by vaporization.

4. The process of claim 3 wherein said Claus catalyst is passed downwardly through the reaction zone as freely falling particles countercurrent to upwardly flowing flue gas at a temperature of 200° to 400° F. whereby the sulfur produced in said reaction of $H_2S$ and $SO_2$ is absorbed on said catalyst, said sulfur containing catalyst then being passed to a regeneration zone where regeneration gas contacts said sulfur containing catalyst at a temperature of 800° to 1050° F. and a velocity of 10 to 30 ft. per sec. thereby vaporizing sulfur from the catalyst, separating catalyst and sulfur, recycling regenerated catalyst to said reactor and recovering the sulfur.

5. Process according to claim 4 wherein the sulfur is recovered by cooling said vaporized sulfur to a temperature in the range from about 245° to 315° F.

6. A process for the conversion of $SO_2$ in flue gas to $H_2S$ comprising the following steps in combination:
   (A) adding to a stream a flue gas containing $SO_2$ and oxygen, a quantity of a hydrocarbon sufficient to place said stream in a slightly reducing condition upon combustion;
   (B) combusting said added hydrocarbon with said oxygen at a temperature in the range of from about 2000° to 3000° F. whereby said oxygen is consumed and hydrogen and carbon monoxide are produced; and
   (C) passing said flue gas containing $SO_2$, hydrogen and carbon monoxide into contact with the catalyst comprising a metal oxide or sulfide selected from the class consisting of the oxides and sulfides of iron, nickel, cobalt, platinum, chromium, molybdenum, tungsten, manganese and mixtures thereof at a temperature in the range between about 1000° to 1600° F. whereby said $SO_2$ in said stream is converted to $H_2S$.

References Cited

UNITED STATES PATENTS

| | | | |
|---|---|---|---|
| 2,799,359 | 7/1957 | Johnson | 23—288 |
| 2,813,699 | 11/1957 | McIntire et al. | 23—288 X |
| 2,902,432 | 9/1959 | Codet et al. | 23—288 |
| 3,197,284 | 7/1965 | Hoekstra | 23—288 X |
| 1,941,702 | 1/1934 | Maier | 23—226 |
| 1,967,263 | 7/1934 | Rosenstein | 23—226 |
| 2,631,921 | 3/1953 | Odell | 23—226 X |
| 1,771,481 | 7/1930 | Benner et al. | 23—225 |
| 2,551,905 | 5/1951 | Robinson | 23—225 |
| 2,887,363 | 5/1959 | Viles | 23—181 |

FOREIGN PATENTS

| | | |
|---|---|---|
| 596,613 | 4/1960 | Canada. |
| 717,482 | 10/1954 | Great Britain. |

OSCAR R. VERTIZ, Primary Examiner

G. O. PETERS, Assistant Examiner

U.S. Cl. X.R.

23—2, 288